US011858469B2

(12) United States Patent
Huang

(10) Patent No.: US 11,858,469 B2
(45) Date of Patent: Jan. 2, 2024

(54) CARRIER

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 0 days.

(21) Appl. No.: 17/737,711

(22) Filed: May 5, 2022

(65) Prior Publication Data
US 2023/0356664 A1 Nov. 9, 2023

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .................................. B60R 9/06; B60R 9/10
USPC ......................................................... 224/282
See application file for complete search history.

(56) References Cited

U.S. PATENT DOCUMENTS

| 5,303,857 | A | * | 4/1994 | Hewson | ..................... | B60R 9/06 |
| | | | | | | 224/520 |
| 5,373,978 | A | * | 12/1994 | Buttchen | ................... | B60R 9/06 |
| | | | | | | 224/532 |
| 5,427,286 | A | * | 6/1995 | Hagerty | ..................... | B60R 9/00 |
| | | | | | | 224/570 |
| 5,529,231 | A | * | 6/1996 | Burgess | ..................... | B60R 9/10 |
| | | | | | | 248/592 |
| 5,685,469 | A | * | 11/1997 | Stapleton | .................. | B60R 9/10 |
| | | | | | | 224/536 |
| 5,950,892 | A | * | 9/1999 | Tsai | .......................... | B60R 9/10 |
| | | | | | | 224/520 |
| 6,129,371 | A | * | 10/2000 | Powell | ..................... | B60R 9/06 |
| | | | | | | 280/491.5 |
| 6,286,738 | B1 | * | 9/2001 | Robins | ..................... | B60R 9/10 |
| | | | | | | 224/532 |
| 6,443,345 | B1 | * | 9/2002 | Bloemer | ................... | B60R 9/06 |
| | | | | | | 224/532 |
| 6,547,116 | B2 | * | 4/2003 | Anderson | ................. | B60R 9/10 |
| | | | | | | 224/536 |
| 6,644,525 | B1 | * | 11/2003 | Allen | ........................ | B60R 9/06 |
| | | | | | | 224/532 |
| 6,929,163 | B1 | * | 8/2005 | Pedrini | ..................... | B60R 9/10 |
| | | | | | | 224/521 |

(Continued)

*Primary Examiner* — Peter N Helvey
(74) *Attorney, Agent, or Firm* — MUNCY, GEISSLER, OLDS & LOWE, P.C.

(57) ABSTRACT

A carrier is provided, including: a mounting rod, configured to be connected to a vehicle; a frame body, including a connecting seat rotatably connected to the mounting rod, a stand rod and two lateral rods, the stand rod and the two lateral rods being connected to the connecting seat, the connecting seat being rotatable between a first position and a second position, wherein when located in the first position, the connecting seat and the mounting rod being stacked; a first quick-release mechanism, including a first elastic abutting portion, the first elastic abutting portion being disposed on one of the mounting rod and the connecting seat, the first elastic abutting portion being blockably abuttable against the other of the mounting rod and the connecting seat so that the connecting seat is positioned in the first position and non-rotatable toward the second position.

8 Claims, 12 Drawing Sheets

(56) References Cited

U.S. PATENT DOCUMENTS

| | | | |
|---|---|---|---|
| 7,261,229 B1* | 8/2007 | Allen | B60R 9/10 224/495 |
| D672,704 S * | 12/2012 | Grago | D12/408 |
| 8,640,888 B2* | 2/2014 | Liu | B60R 9/10 224/501 |
| 9,802,549 B1* | 10/2017 | Shen | B60R 9/10 |
| 10,183,627 B1* | 1/2019 | Liu | B60R 9/06 |
| 10,384,618 B2* | 8/2019 | Williams | B60R 9/10 |
| 10,906,473 B1* | 2/2021 | Yu | B60R 9/06 |
| 11,148,607 B1* | 10/2021 | Hsieh | B60R 9/045 |
| D946,490 S * | 3/2022 | Li | D12/408 |
| D952,539 S * | 5/2022 | Shen | D12/407 |
| D955,970 S * | 6/2022 | Shen | D12/407 |
| 11,383,779 B1* | 7/2022 | Huang | B62H 3/00 |
| D964,254 S * | 9/2022 | Huang | D12/407 |
| 11,465,702 B2* | 10/2022 | Williams | B25H 3/04 |
| 11,472,502 B1* | 10/2022 | Huang | B60R 9/06 |
| 11,511,677 B2* | 11/2022 | Peng | B60R 9/10 |
| 2005/0061842 A1* | 3/2005 | Tsai | B60R 9/06 224/501 |
| 2005/0133555 A1* | 6/2005 | Bove | B60R 9/06 224/924 |
| 2008/0099522 A1* | 5/2008 | Clausen | B60R 9/06 224/519 |
| 2008/0230579 A1* | 9/2008 | Wang | B60R 9/10 224/400 |
| 2009/0120984 A1* | 5/2009 | Sautter | B60R 9/10 224/532 |
| 2010/0096424 A1* | 4/2010 | Kuschmeader | B60R 9/06 224/509 |
| 2010/0230455 A1* | 9/2010 | Wang | B60R 9/06 224/533 |
| 2010/0320247 A1* | 12/2010 | Wang | B60R 9/10 224/567 |
| 2011/0068140 A1* | 3/2011 | Stevens | B60R 9/10 224/533 |
| 2013/0062383 A1* | 3/2013 | Jeli | B60R 9/10 224/549 |
| 2013/0062385 A1* | 3/2013 | Pedrini | B60R 9/10 224/501 |
| 2013/0243518 A1* | 9/2013 | Wiedemann | F16B 7/044 403/205 |
| 2014/0027484 A1* | 1/2014 | Loken | B60R 9/06 224/521 |
| 2014/0151421 A1* | 6/2014 | Loken | B60R 9/06 224/519 |
| 2016/0068111 A1* | 3/2016 | Walker | B60R 9/10 224/521 |
| 2017/0253188 A1* | 9/2017 | Shen | B60R 9/10 |
| 2017/0349110 A1* | 12/2017 | Bass | B60R 9/10 |
| 2017/0349111 A1* | 12/2017 | Ramsdell | B60R 9/06 |
| 2018/0072237 A1* | 3/2018 | Kuschmeader | B60R 9/10 |
| 2018/0134229 A1* | 5/2018 | Shen | B60R 9/06 |
| 2018/0147997 A1* | 5/2018 | Woelfling | B60R 9/06 |
| 2018/0354427 A1* | 12/2018 | Yazdian | B60R 9/10 |
| 2019/0016271 A1* | 1/2019 | Garceau | B60R 9/06 |
| 2019/0161022 A1* | 5/2019 | McFadden | B60R 9/10 |
| 2020/0023787 A1* | 1/2020 | Prescott | B60R 9/10 |
| 2020/0031289 A1* | 1/2020 | Williams | B60R 9/045 |
| 2020/0086803 A1* | 3/2020 | Settelmayer | B60R 9/10 |
| 2020/0156724 A1* | 5/2020 | Kuschmeader | B62H 3/12 |
| 2020/0172185 A1* | 6/2020 | Hammond | B62H 3/12 |

\* cited by examiner

CARRIER

BACKGROUND OF THE INVENTION

Field of the Invention

The present invention relates to a carrier.

Description of the Prior Art

Nowadays, people like to engage in outdoor leisure activities for relaxing body and mind when they are on vacation. For example, it is popular to place bicycles on a carrier which is configured to be connected to a vehicle. The conventional carrier has a mounting rod and a main frame, and the mounting rod is configured to be connected to the vehicle. The main frame has a stand rod and a supporting rod for installing and positioning the bicycle. In order to open the rear door of the vehicle without dismantling the carrier, the main frame and the mounting rod of the carrier are rotatably and adjustably connected with each other, and a positioning mechanism is therefore provided to prevent the main frame body and mounting rod from unexpected relative rotation. However, the positioning mechanism of the conventional carrier is easy to disengage from positioning during the travel of the vehicle, which causes unstable relative movement of the main frame and the mounting rod resulting in falling of the bicycle.

The present invention is, therefore, arisen to obviate or at least mitigate the above-mentioned disadvantages.

SUMMARY OF THE INVENTION

The main object of the present invention is to provide a carrier which is stable and safe in use.

To achieve the above and other objects, a carrier is provided, including: a mounting rod, configured to be connected to a vehicle; a frame body, including a connecting seat, a stand rod and two lateral rods, the stand rod and the two lateral rods being connected to the connecting seat, the connecting seat being rotatably connected to the mounting rod by a shaft and rotatable between a first position and a second position, wherein when the connecting seat is located in the first position, the connecting seat and the mounting rod being stacked; a first quick-release mechanism, including a first elastic abutting portion, the first elastic abutting portion being disposed on one of the mounting rod and the connecting seat, the first elastic abutting portion being blockably abuttable against the other of the mounting rod and the connecting seat so that the connecting seat is positioned in the first position and non-rotatable toward the second position.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
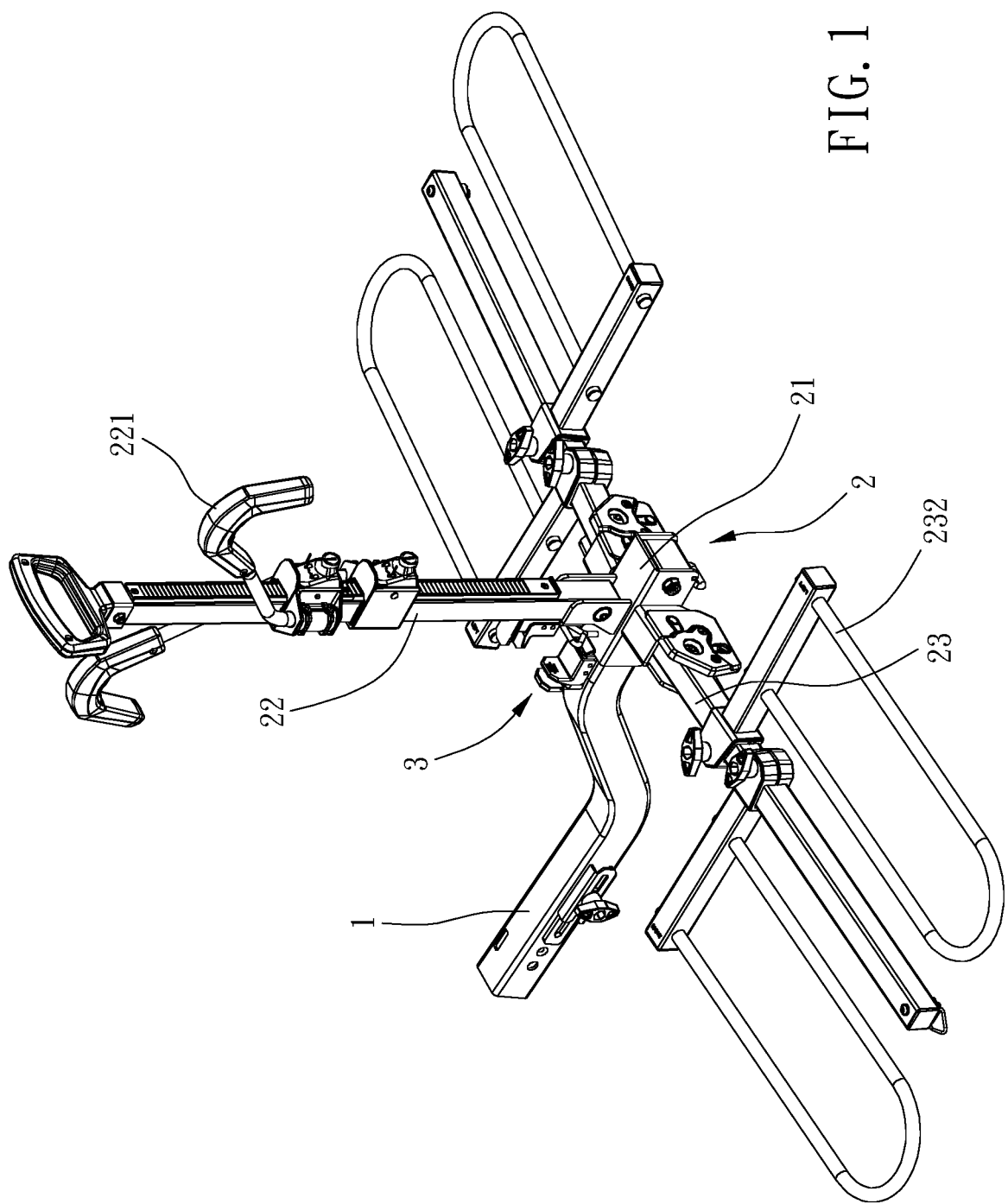
FIG. 1 is a stereogram of a preferable embodiment of the present invention.
Figure 2:
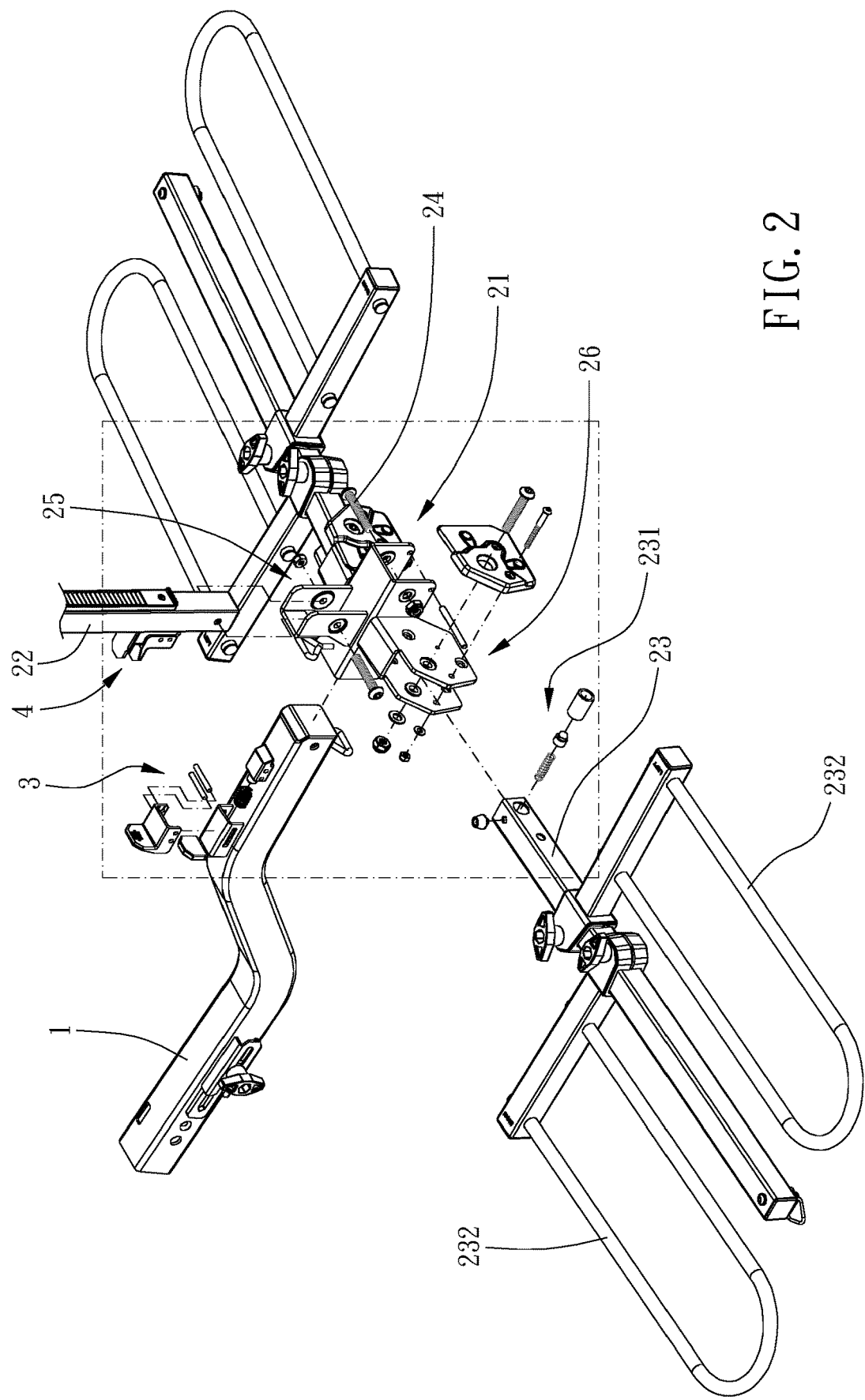
FIG. 2 is a breakdown drawing of a preferable embodiment of the present invention.
Figure 3:
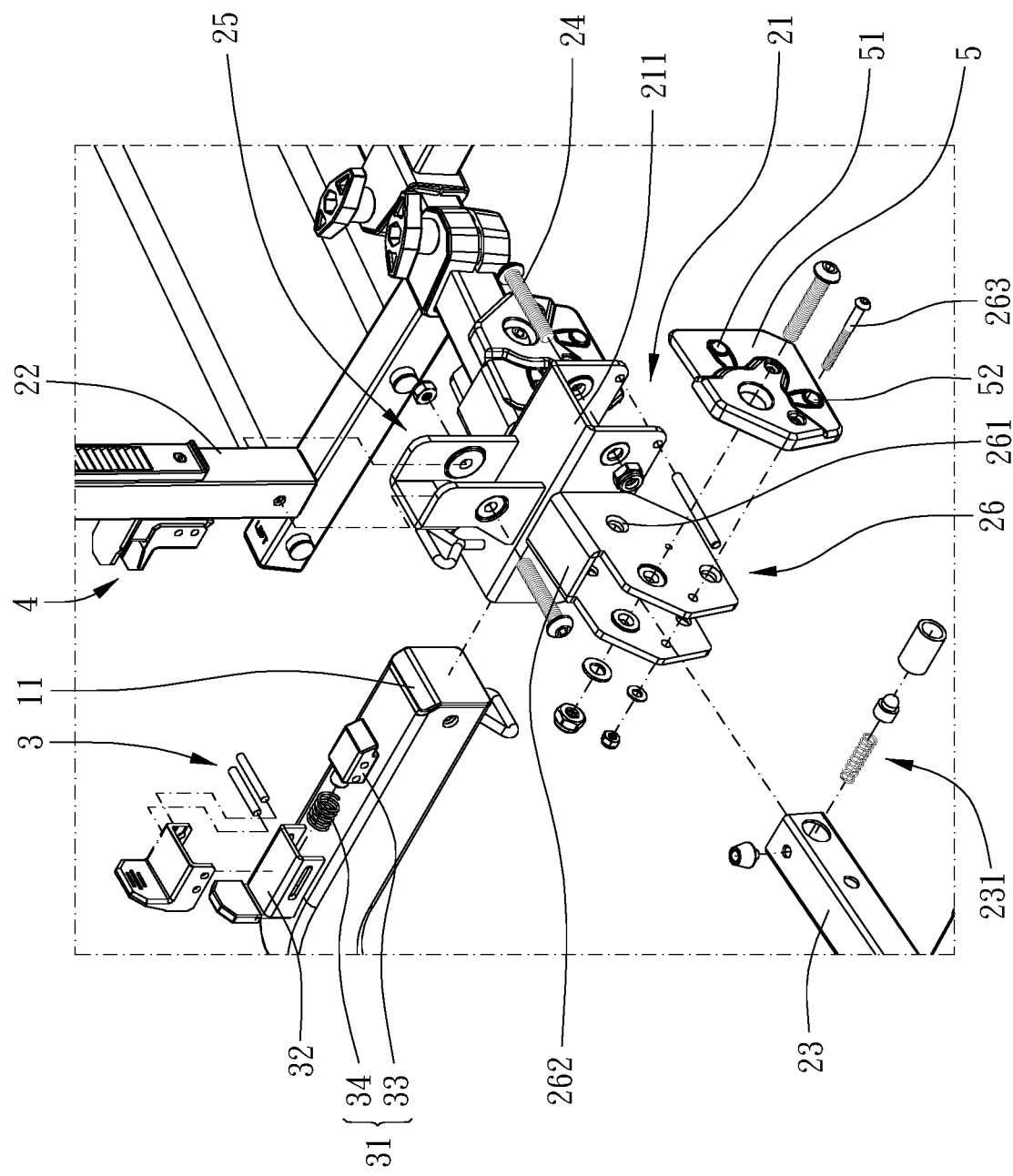
FIG. 3 is an enlargement of FIG. 2.

Please refer to FIGS. 1 to 12 for a preferable embodiment of the present invention. A carrier of the present invention includes a mounting rod 1, a frame body 2 and a first quick-release mechanism 3.

The mounting rod 1 is configured to be connected to a vehicle 9.

The frame body 2 includes a connecting seat 21, a stand rod 22 and two lateral rods 23. The stand rod 22 and the two lateral rods 23 are connected to the connecting seat 21, and the connecting seat 21 is rotatably connected to the mounting rod 1 by a shaft 24 and rotatable between a first position and a second position. When the connecting seat 21 is located in the first position, the connecting seat 21 and the mounting rod 1 are stacked.

The first quick-release mechanism 3 includes a first elastic abutting portion 31, the first elastic abutting portion 31 is disposed on one of the mounting rod 1 and the connecting seat 21, and the first elastic abutting portion 31 is blockably abuttable against the other of the mounting rod 1 and the connecting seat 21 so that the connecting seat 21 is positioned in the first position and non-rotatable toward the second position.

The first quick-release mechanism 3 includes a first fixation seat 32, the first elastic abutting portion 31 includes a first slidable member 33 and a first elastic member 34, the first slidable member 33 is slidably disposed on the first fixation seat 32, and the first elastic member 34 is disposed between the first slidable member 33 and the first fixation seat 32 so that the first slidable member 33 is biased away from the first fixation seat 32. In this embodiment, the first fixation seat 32 is disposed on the mounting rod 1, the connecting seat 21 includes an upper plate 211, and when the connecting seat 21 is located in the first position, the upper plate 211 covers the mounting rod 1 and the first slidable member 33 is abutted against a side of the upper plate 211 remote from the mounting rod 1 so that the connecting seat 21 is positioned in the first position. The first fixation seat may be disposed on the connecting seat and is blocked with the mounting rod so that the connecting seat is positioned in the first position.

Figure 4:
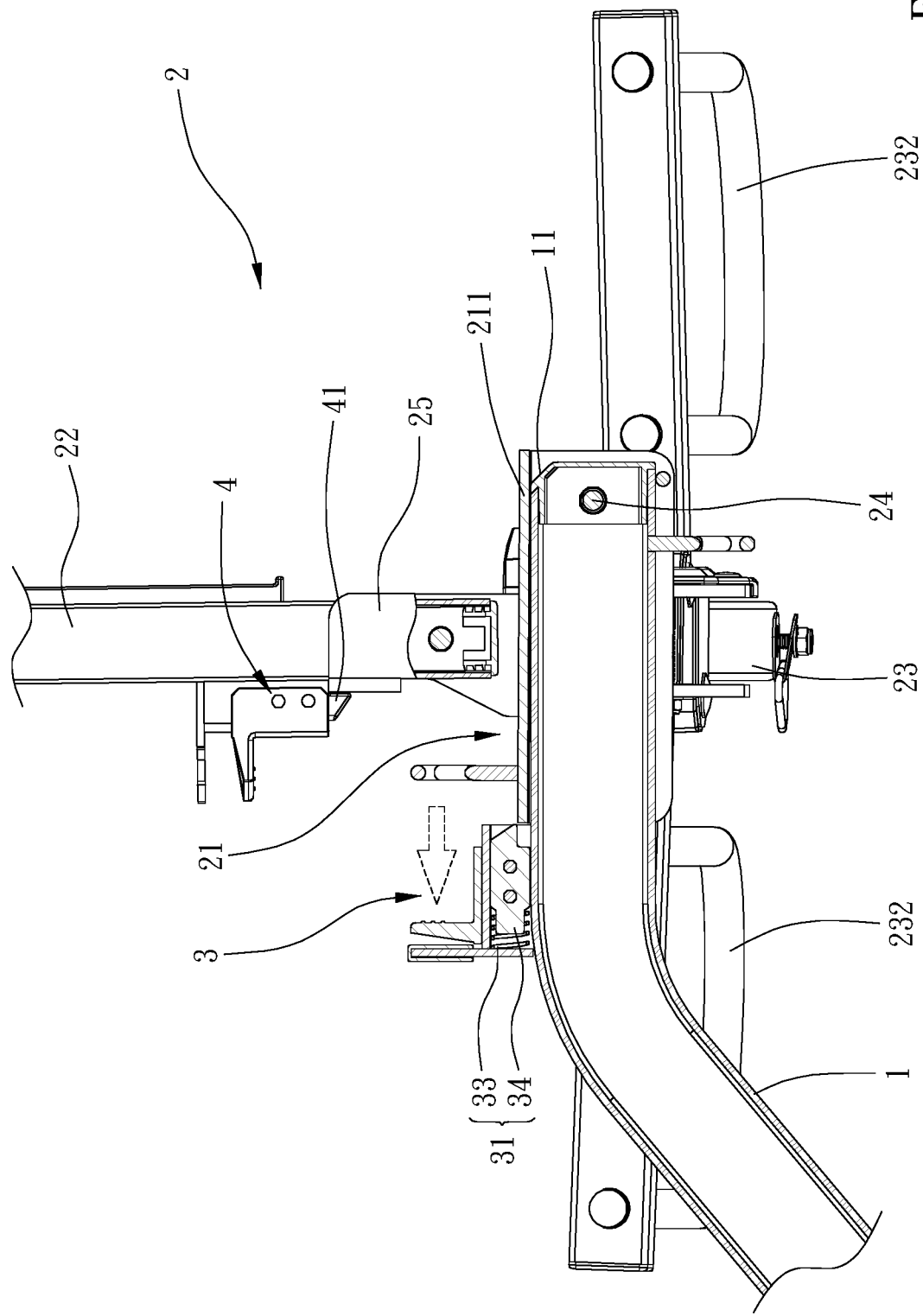
FIGS. 4 and 5 are drawings showing operation of a connecting seat according to a preferable embodiment of the present invention.
Figure 5:
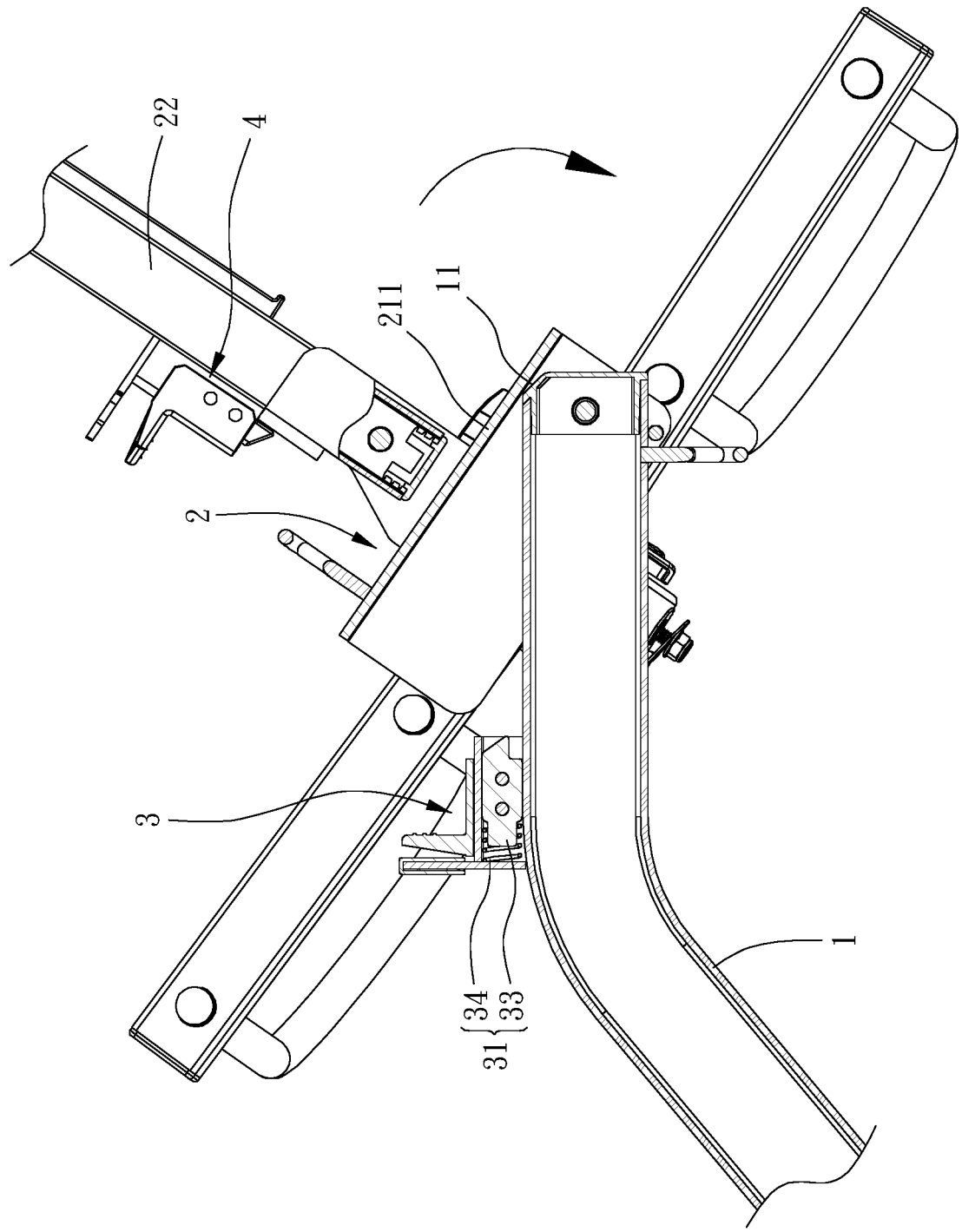
Figure 6:
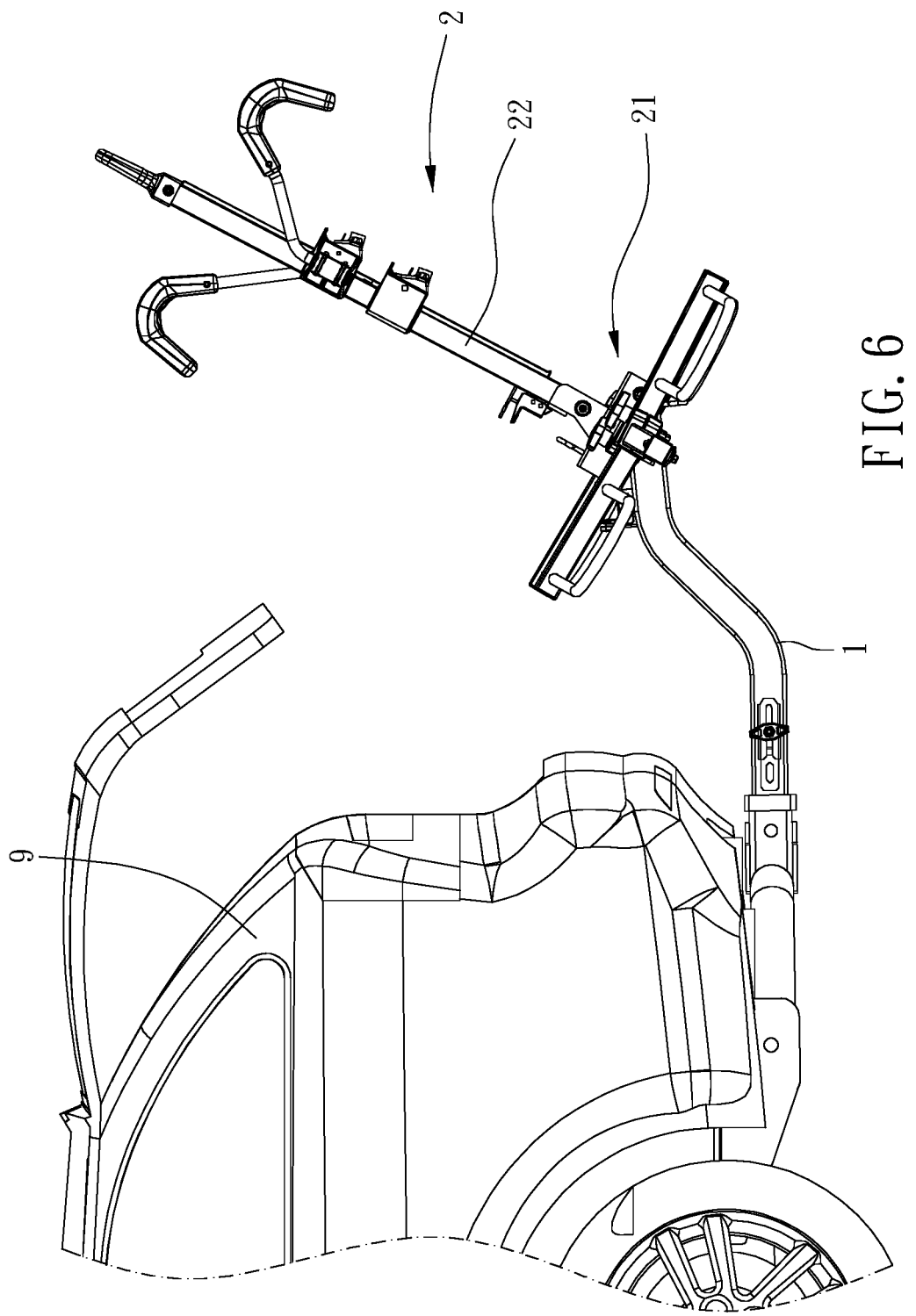
FIG. 6 is a drawing showing application of a preferable embodiment of the present invention.

When the connecting seat 21 is located in the first position, the first slidable member 33 of the first elastic abutting portion 31 is abutted against the side of the upper plate 211 remote from the mounting rod 1, and thus the connecting seat 21 is stably positioned in the first position so that it is safe during moving of the vehicle 9 (FIG. 4). Before the rear door of the vehicle 9 is open, the first slidable member 33 of the first elastic abutting portion 31 is moved toward the first fixation seat 32 so that the connecting seat 21 is rotatable toward the second position, and thus the rear door of the vehicle 9 is not blockable by the connecting seat 21 when opened (FIGS. 5 and 6).

Figure 7:
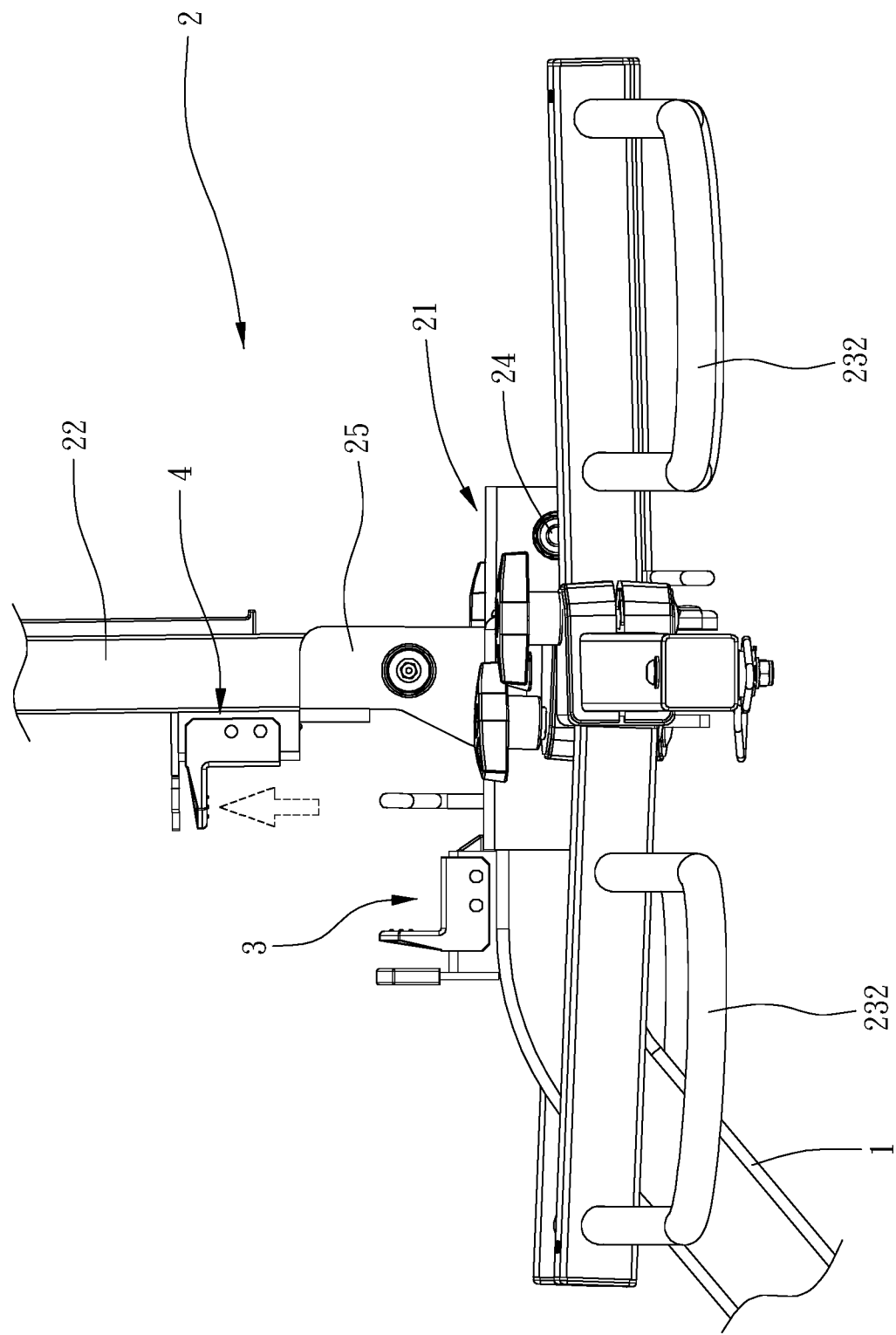
FIGS. 7 and 8 are drawings showing operation of a stand rod according to a preferable embodiment of the present invention.
Figure 8:
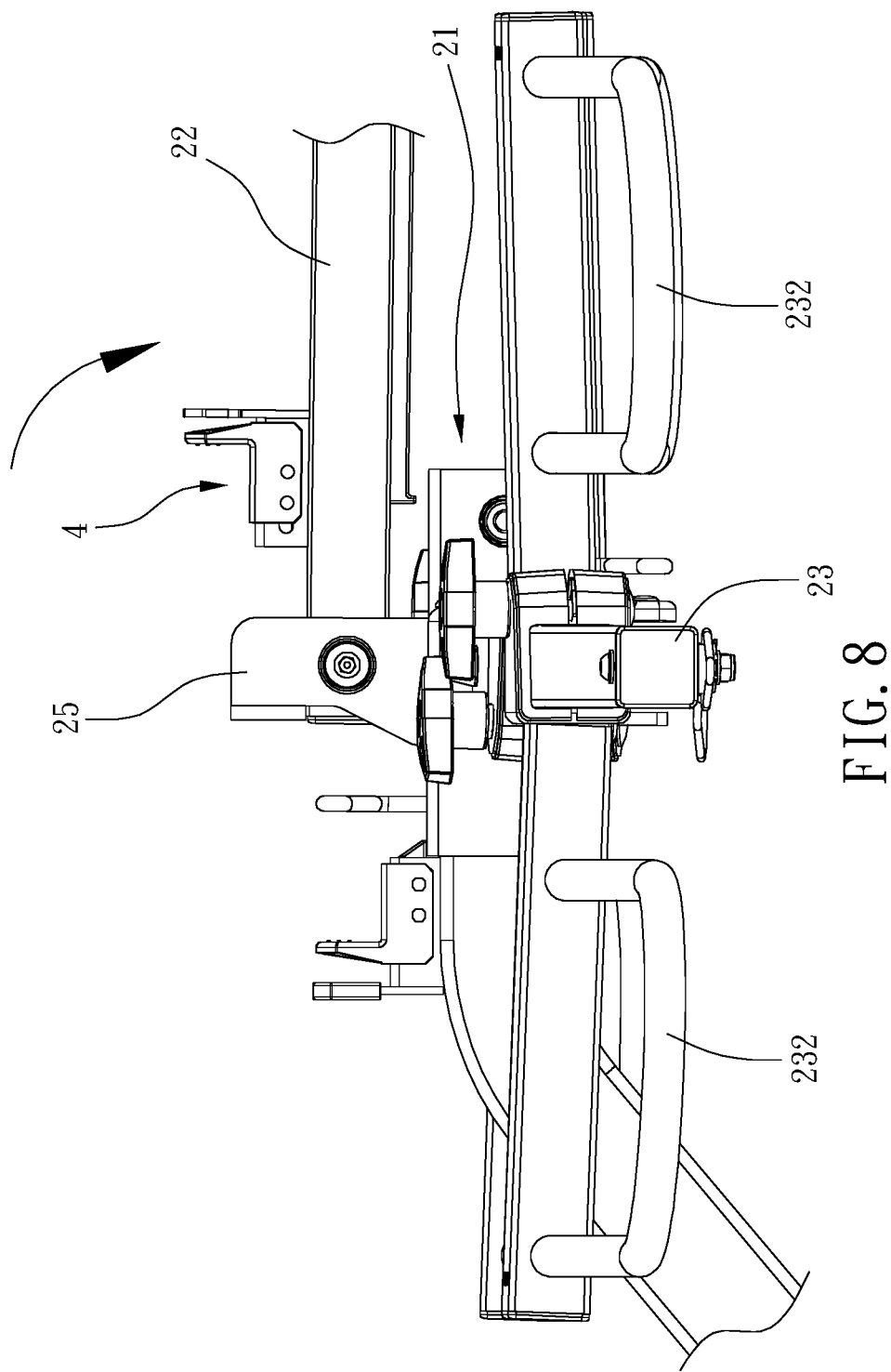
Figure 9:
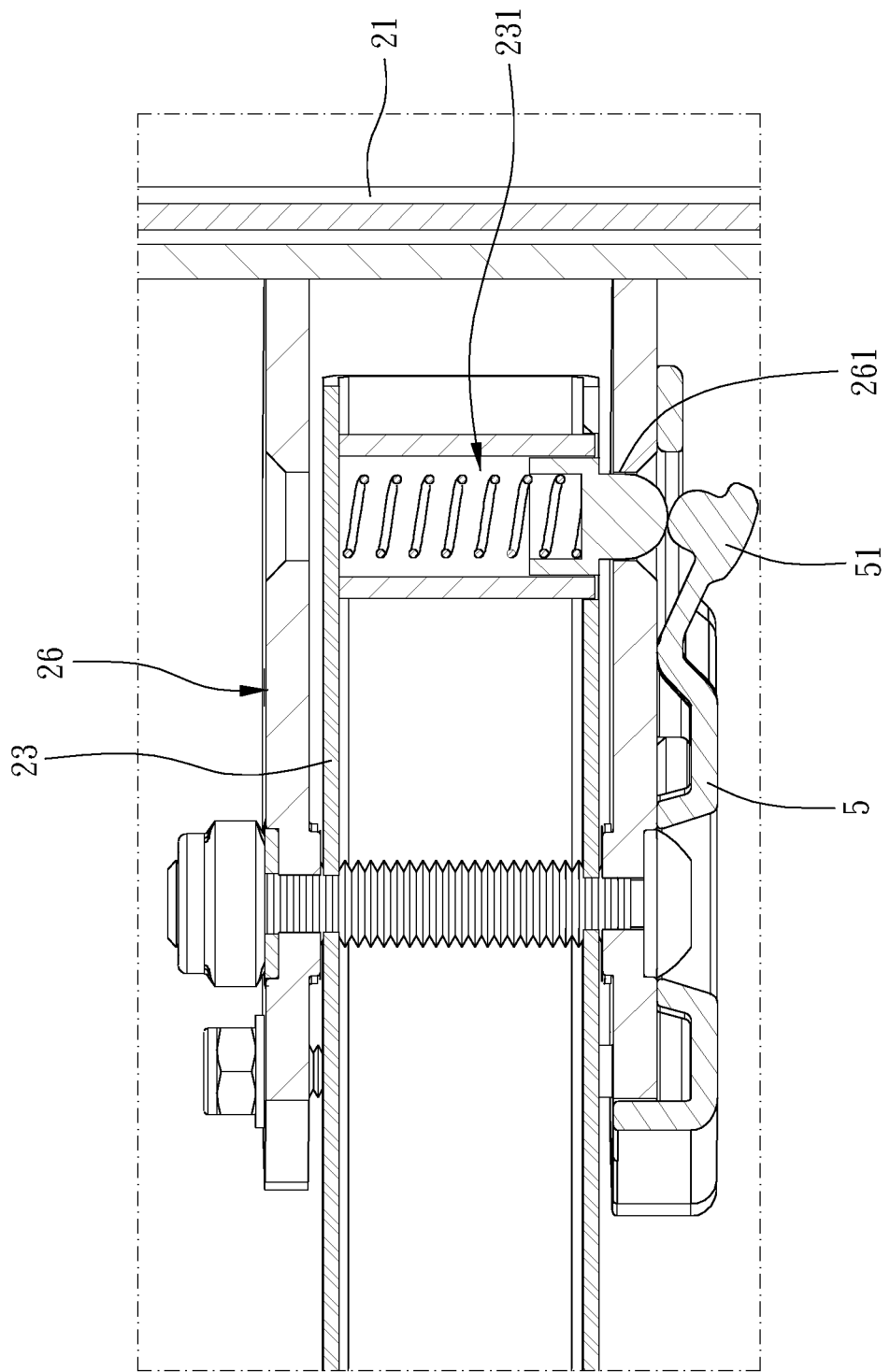
FIGS. 9 and 10 are drawings showing operation of an elastic positioning member according to a preferable embodiment of the present invention.
Figure 10:
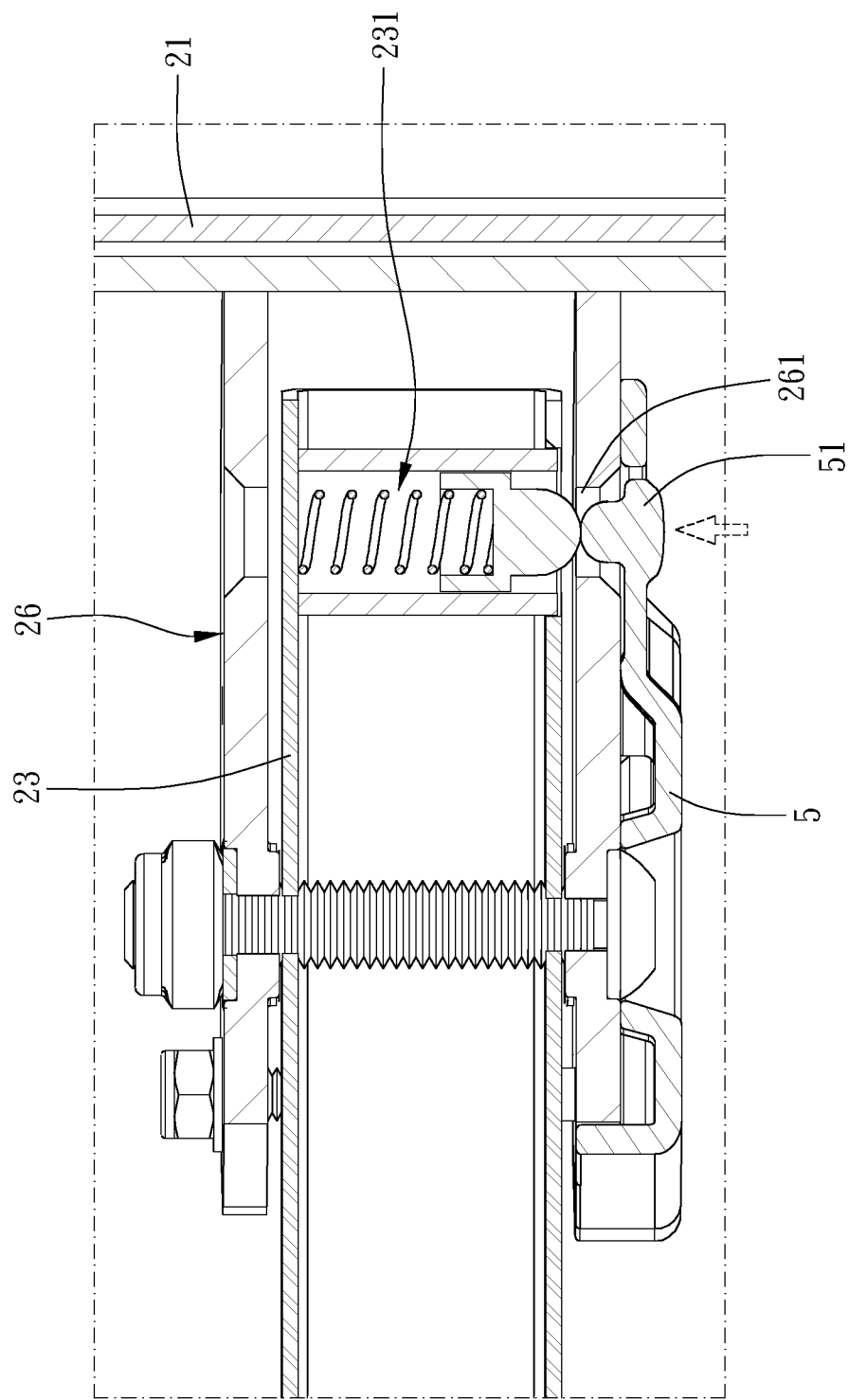
Figure 11:
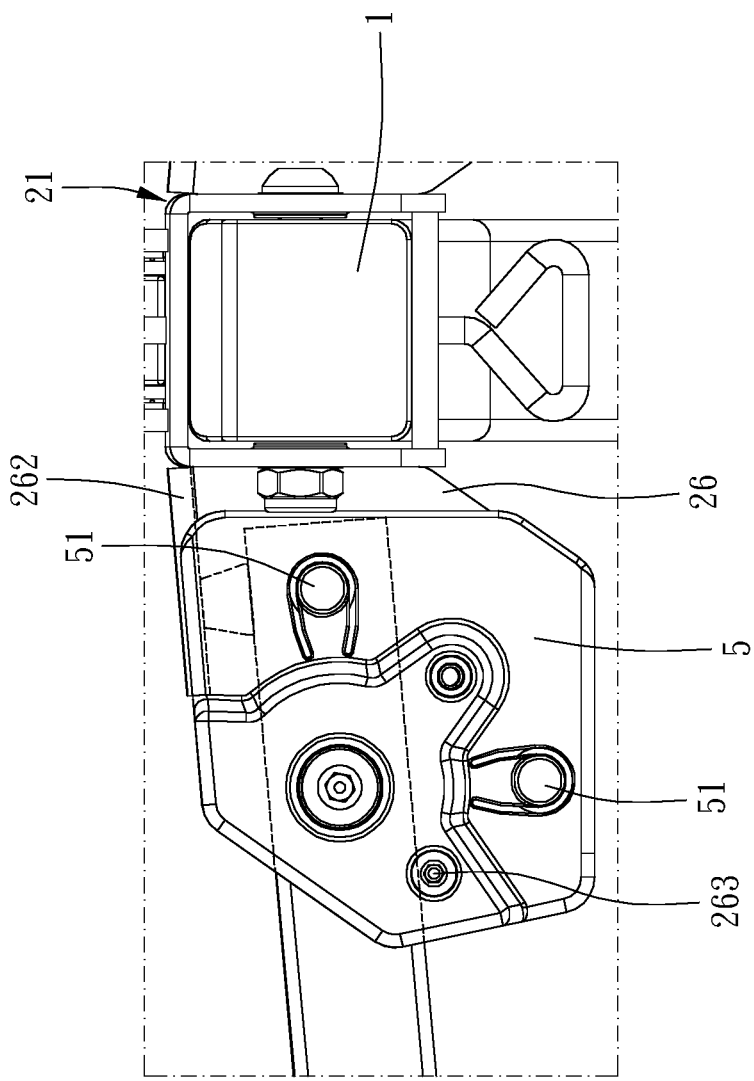
FIGS. 11 and 12 are drawings showing operation of a lateral rod according to a preferable embodiment of the present invention.
Figure 12:
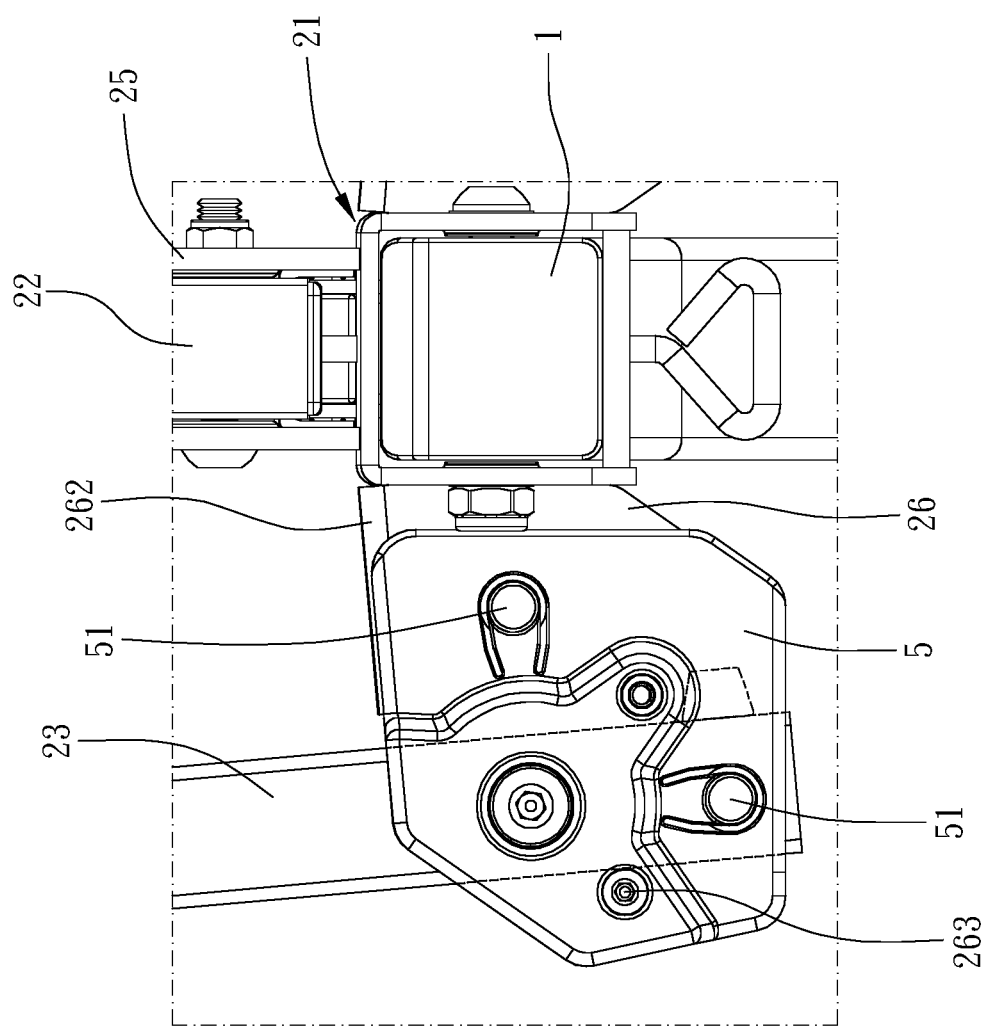

In this embodiment, each of opposing sides of the stand rod 22 includes a retaining member 221, and each of the two lateral rods 23 includes two carrying members 232 each corresponding to one of the two retaining members 221. Each of the two retaining members 221 is configured for retaining a bicycle, and each of the carrying members 232 is configured for supporting a wheel of the bicycle. Preferably, the upper plate 211 includes an upright seat 25, the stand rod 22 is rotatably connected to the upright seat 25, and the carrier further includes a second quick-release mechanism 4. The second quick-release mechanism 4 is connected to one of the upright seat 25 and the stand rod 22, and the second quick-release mechanism 4 is blockably abuttable against the other of the upright seat 25 and the stand rod 22 so that the stand rod 22 is non-rotatable relative to the upright seat 25. In this embodiment, the second quick-release mechanism 4 is connected to the stand rod 22, the second quick-release mechanism 4 includes a second elastic abutting portion 41, and when the stand rod 22 is abutted against a side of the upright seat 25, the second elastic abutting portion 41 elastically urges a side of the upright seat 25 remote from the stand rod 22 (FIGS. 7 and 8).

When the wheels of the bicycle is to be disposed on the two carrying members 232 toward the front of the vehicle 9, the second elastic abutting portion 41 is controlled and the stand rod 22 is rotated away from the vehicle 9, for easy loading of the bicycle on the carrier.

Specifically, a top of an end of the mounting rod 1 remote from the vehicle 9 includes an inclined surface 11, and when the connecting seat 21 rotates to be in the second position, the inclined surface 11 is abutted against the upper plate 211 so that the connecting seat 21 is positioned in the second position, which prevents the bicycle from falling due to excessive swinging of the connecting seat 21 and the mounting rod 1. Moreover, the inclined surface 11 prevents the connecting seat 21 from being blocked during rotation from the first position toward the second position.

Please refer to FIGS. 9-12, two side seats 26 are connected to opposing sides of the connecting seat 21, respectively; the two lateral rods 23 are rotatably connected to the two side seats 26, respectively; a side of each of the two side seats 26 includes two positioning holes 261, and each of the two lateral rods 23 includes an elastic positioning member 231; and when the elastic positioning member 231 corresponds to and engages in one of the two positioning holes 261, the lateral rod 23 is non-rotatable relative to the side seat 26. Each of the two lateral rods 23 is positioned between the two positioning holes 261 of the side seat 26 by the elastic positioning member 231, which allowing operation of unfolding (FIG. 11) or folding (FIG. 12) of the carrier.

Preferably, each of the two side seats 26 is covered by a cover plate 5 which is preferably made of pliable material (such as plastic) and includes at least two elastic caps 51 each corresponding to one of the two positioning holes 261. Each elastic cap 51 is elastically flexible and integrally formed with the cover plate 5. The elastic positioning member 231 can be disengaged from the positioning hole 261 by pressing the elastic cap 51. The cover plate 5 made of pliable material is comfortable for the user in pressing the elastic positioning member 231.

Preferably, an upper portion of each of the two side seats 26 adjacent to the connecting seat 21 includes an upper blocking member 262, and a lower portion of each of the two side seats 26 remote from the connecting seat 21 includes a lower blocking member 263. A position at which the side seat 26 and the lateral rod 23 are rotatably connected is located between the upper blocking member 262 and the lower blocking member 263. When each of the two lateral rods 23 rotates downward (FIG. 11), an end of each of the two lateral rods 23 directed toward the connecting seat 21 is abutted against the upper blocking member 262, and another end of each of the two lateral rods 23 is abutted against the lower blocking member 263, so that the two lateral rods 23 are positioned.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A carrier, including:
a mounting rod, configured to be connected to a vehicle;
a frame body, including a connecting seat, a stand rod and two lateral rods, the stand rod and the two lateral rods being connected to the connecting seat, the connecting seat being rotatably connected to the mounting rod by a shaft and rotatable between a first position and a second position, wherein when the connecting seat is located in the first position, the connecting seat and the mounting rod being stacked;
a first quick-release mechanism, including a first elastic abutting portion, the first elastic abutting portion being disposed on one of the mounting rod and the connecting seat, the first elastic abutting portion being blockably abuttable against the other of the mounting rod and the connecting seat so that the connecting seat is positioned in the first position and non-rotatable toward the second position;
wherein the first quick-release mechanism includes a first fixation seat, the first elastic abutting portion includes a first slidable member and a first elastic member, the first slidable member is slidably disposed on the first fixation seat, and the first elastic member is disposed between the first slidable member and the first fixation seat so that the first slidable member is biased away from the first fixation seat;
wherein the first fixation seat is disposed on the mounting rod, the connecting seat includes an upper plate, and when the connecting seat is located in the first position, the upper plate covers the mounting rod and the first slidable member is abutted against a side of the upper plate remote from the mounting rod so that the connecting seat is positioned in the first position.

2. The carrier of claim 1, wherein the upper plate includes an upright seat, the stand rod is rotatably connected to the upright seat, the carrier further includes a second quick-release mechanism, the second quick-release mechanism is connected to one of the upright seat and the stand rod, and the second quick-release mechanism is blockably abuttable against the other of the upright seat and the stand rod so that the stand rod is non-rotatable relative to the upright seat.

3. The carrier of claim 1, wherein a top of an end of the mounting rod remote from the vehicle includes an inclined surface, and when the connecting seat rotates to be in the second position, the inclined surface is abutted against the upper plate so that the connecting seat is positioned in the second position.

4. The carrier of claim 2, wherein the second quick-release mechanism is connected to the stand rod, the second quick-release mechanism includes a second elastic abutting portion, and when the stand rod is abutted against a side of the upright seat, the second elastic abutting portion elastically urges the upright seat.

5. The carrier of claim 1, wherein two side seats are connected to opposing sides of the connecting seat, respectively; the two lateral rods are rotatably connected to the two side seats, respectively; a side of each of the two side seats includes two positioning holes, and each of the two lateral rods includes an elastic positioning member; when the elastic positioning member corresponds to and engages in one of the two positioning holes, the lateral rod is non-rotatable relative to the side seat.

6. The carrier of claim 5, wherein each of the two side seats is covered by a cover plate which includes at least two elastic caps each corresponding to one of the two positioning holes.

7. The carrier of claim 5, wherein an upper portion of each of the two side seats adjacent to the connecting seat includes an upper blocking member, a lower portion of each of the two side seats remote from the connecting seat includes a lower blocking member, a position at which the side seat and the lateral rod are rotatably connected is located between the upper blocking member and the lower blocking member, and when each of the two lateral rods rotates downward, an end of each of the two lateral rods directed toward the connecting seat is abutted against the upper blocking member, and another end of each of the two lateral rods is abutted against the lower blocking member.

8. The carrier of claim 1, wherein each of opposing sides of the stand rod includes a retaining member, and each of the two lateral rods includes two carrying members each corresponding to one of the two retaining members.

\* \* \* \* \*